United States Patent [19]
Inoue et al.

[11] Patent Number: 6,088,775
[45] Date of Patent: Jul. 11, 2000

[54] DATA ACCESS CONTROLLER AND DATA ACCESS CONTROL METHOD

[75] Inventors: Koji Inoue, Chiba; Hirofumi Todo, Tokyo; Masahiro Shigenobu, Kanagawa, all of Japan

[73] Assignee: Sony Corporation, Tokyo, Japan

[21] Appl. No.: 08/954,300

[22] Filed: Oct. 20, 1997

[30]     Foreign Application Priority Data

Oct. 22, 1996   [JP]   Japan .................................... 8-279272

[51] Int. Cl.⁷ ................................................. G06F 13/16
[52] U.S. Cl. ............................................ 711/167; 711/157
[58] Field of Search .................................. 711/118, 154, 711/157, 167; 710/52, 53

[56]           References Cited

U.S. PATENT DOCUMENTS

| | | | |
|---|---|---|---|
| 4,742,543 | 5/1988 | Frederiksen | 380/9 |
| 5,305,319 | 4/1994 | Sowell | 370/463 |
| 5,884,099 | 3/1999 | Klingelhofer | 710/52 |
| 5,917,792 | 6/1999 | Shigenobu et al. | 369/59 |

*Primary Examiner*—Eddie P. Chan
*Assistant Examiner*—Kevin L. Ellis
*Attorney, Agent, or Firm*—Limbach & Limbach L.L.P.

[57]           ABSTRACT

A data access controller has an SRAM adapted to hold two ECC blocks so that the SRAM is used efficiently for multiple kinds of processes. At playback of data, writing of ECC block A from a demodulator and an ECC process for ECC block B begin simultaneously. When the ECC process ends, release of the ECC block B to the outside begins. When the writing of ECC block A ends, the ECC process for the ECC block A begins and, at the same time, writing of ECC block B from the demodulator begins.

12 Claims, 7 Drawing Sheets

PLAYBACK MODE

HATCHED AREA IS NOT ACCESSED

※ SRAM HAS TWO DATA MAPS, WITH ADDRESS BIT-16 BEING 0 AND 1

SRAM DATA MAP IS 1 MBITS

DATA ACCESS CONTROLLER AND DATA ACCESS CONTROL METHOD

BACKGROUND OF THE INVENTION

1. Field of the Invention

The present invention relates to a data access controller and data access control method, and particularly to a data access controller and data access control method which are intended for making access to an SRAM efficient during a modulation/demodulation process, error detection/correction process, or data transfer process, for example.

2. Description of the Prior Art

In recording or playing back data to/from a recording medium such as a mini disc (MD) (trademark), it is necessary to prepare a static random access memory (SRAM) for each error correction code (ECC) block which is the unit of data recording and playback, and encode or decode an ECC block concurrently to the process of the modulator/demodulator (modem). On this account, it is a conceivable manner to have two or more SRAMs. In the following explanation, two SRAMs will be called a first SRAM and second SRAM.

At data recording, for example, data to be recorded is written into the first SRAM, the data is read out of the first SRAM by an ECC encoder, and the data, with C1 and C2 parities being appended thereto (will be termed "ECC block"), is written into the second SRAM. Concurrently with these operations, an ECC block is read out of the second SRAM by the modulator, and it is modulated and recorded on the MD.

At data playback, an ECC block is read out of the MD, and it is demodulated by the demodulator and written into the second SRAM. Concurrently to these operations, an ECC block is read out of the second SRAM, error detected and corrected by the ECC decoder, and written into the first SRAM.

Based on the provision of two SRAMs, it is possible to carry out concurrently the modulation/demodulation process by the modem and the encoding process by the ECC encoder or error detection/correction process by the ECC decoder.

However, the presence of two SRAMs results in an increased number of bus lines and a larger circuit scale. Moreover, the memory access time for external input/output is so tight that it is required for the external input/output operation to use another buffer SRAM, or reduce the number of times of performing of ECC detection/correction process, or raise the master clock frequency.

SUMMARY OF THE INVENTION

The present invention is intended to deal with the foregoing prior art situation, and its prime object is to provide a data access controller and data access control method capable of reducing the circuit scale inclusive of SRAMs used for the modulation/demodulation process and error detection/correction process, and enhancing the error correcting ability.

The inventive data access controller comprises means of holding data, means of generating addresses for accessing to the memory means in correspondence with multiple kinds of processes, and means of providing the addresses on a time-slice basis for the memory means, wherein the memory means is accessed for data reading and writing at addresses given on a time-slice basis by the address providing means, and the address generation means generates addresses such that reading-out of data from a certain memory address by a certain one of the multiple kinds of processes takes place earlier by a prescribed time than writing of data to a memory address by certain one other process.

The inventive data access controller comprises means of holding data, means of generating addresses for making access to the memory means in correspondence to multiple kinds of processes, means of providing the addresses on a time-slice basis for the memory means, means of generating a first clock signal, and means of generating a second clock signal which is different in phase from the first clock signal, wherein the address generation means and address providing means operate in accordance with the first and second clock signals, and the memory means is accessed for data input/output by being timed to the rising of the first and second clock signals.

The inventive data access controller comprises means of holding data, means of generating addresses for making access to the memory means in correspondence to multiple kinds of processes, means of providing the addresses on a time-slice basis for the memory means, and means of appending C1 and C2 parities to data, wherein the memory means writes and reads out data at addresses given on a time-slice basis by the address providing means, the parity appending means distributes the C2 parities so that their memory addresses scatter, and the address generation means generates different addresses for the case of the ECC encoding process in which the C1 and C2 parities are appended to data and for the case of the data modulation process or data demodulation process.

The inventive data access control method comprises the steps of generating addresses such that reading-out of data from a certain memory address by a certain one of multiple kinds of processes takes place earlier by a prescribed time than writing of data to a memory address by a certain other process, and providing the addresses on a time-slice basis for the memory means.

In the data access controller the memory means holds data, the address generation means generates addresses for making access to the memory means in correspondence to multiple kinds of processes, and the address providing means provides the addresses on a time-slice basis for the memory means. The memory means is accessed for data reading and writing at addresses given on a time-slice basis by the address providing means, and the address generation means generates addresses such that reading-out of data from a certain memory address by a certain one of the multiple kinds of processes takes place earlier by a prescribed time than writing of data to a memory address by a certain other process.

In the data access controller the memory means holds data, the address generation means generates addresses for making access to the memory means in correspondence to multiple kinds of processes, the address providing means provides the addresses on a time-slice basis for the memory means, the first clock signal generation means generates a first clock signal, and a second clock signal generation means generates a second clock signal which is different in phase from the first clock signal. The address generation means and address providing means operate in accordance with the first and second clock signals, and the memory means is accessed for data input/output by being timed to the rising of the first and second clock signals.

In the data access controller the memory means holds data, the address generation means generates addresses for making access to the memory means in correspondence to multiple kinds of processes, the address providing means provides the addresses on a time-slice basis to the memory means, the parity appending means appends C1 and C2 parities to data. The memory means writes and reads out data at addresses given on a time-slice basis by the address providing means, the parity appending means distributes the C2 parities so that their memory addresses scatter, and the address generation means generates different addresses for an ECC encoding process in which the C1 and C2 parities are appended to data and for a data modulation process or data demodulation process.

In the data access control method memory addresses are generated such that reading-out of data from a certain memory address by a certain one of multiple kinds of processes takes place earlier by a prescribed time than writing of data to a memory address by a certain other process, and the addresses are given on a time-slice basis to the memory means.

DESCRIPTION OF THE PREFERRED EMBODIMENT

Figure 1:
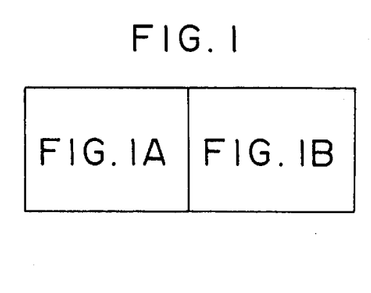
FIGS. 1A and 1B are block diagrams of a mini disc recording/playback apparatus that is accomplished by application of a data access controller based on an embodiment of this invention.
Figure 1A:
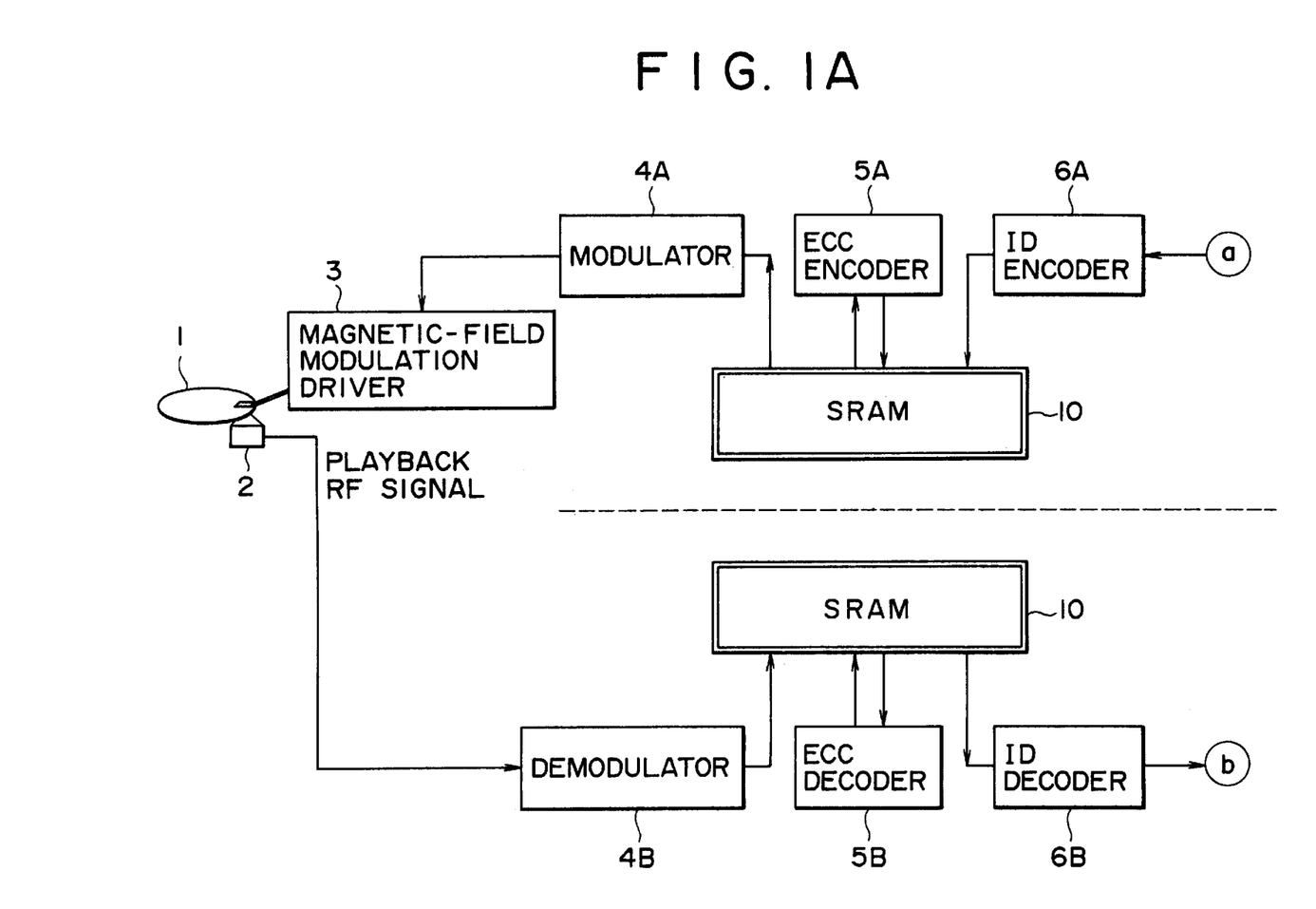
Figure 1B:
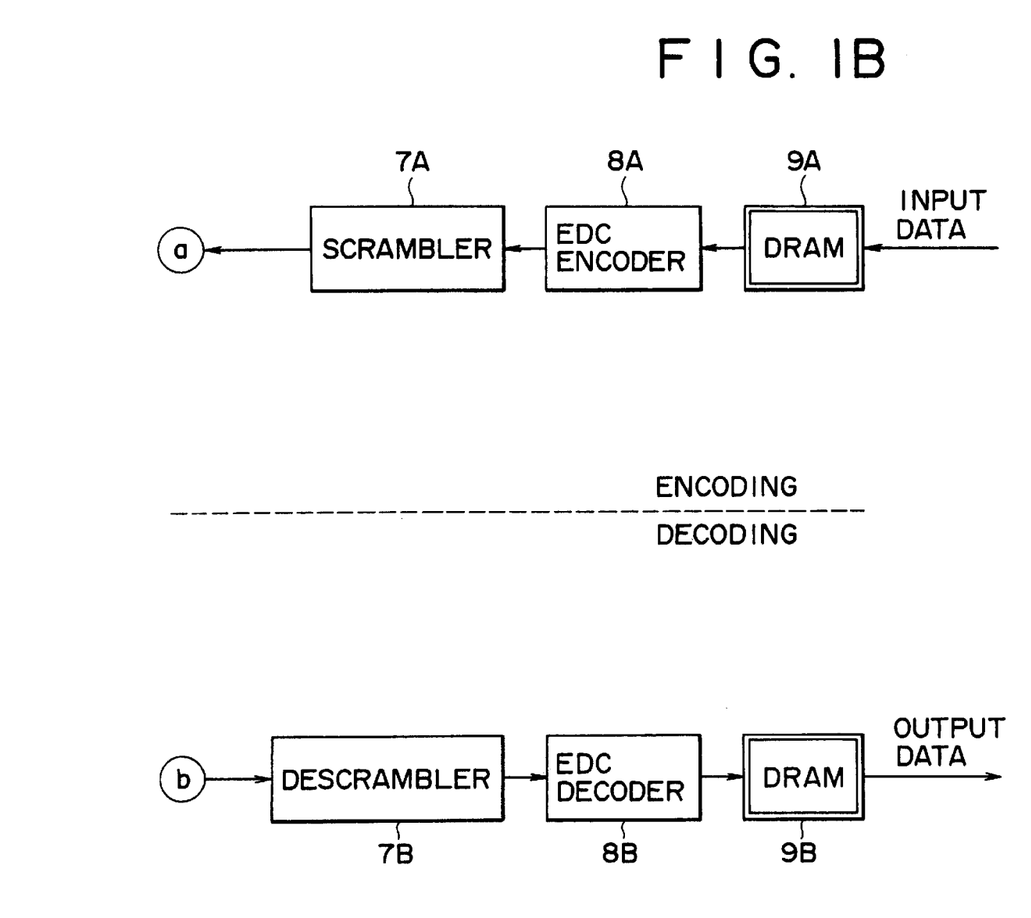

In FIGS. 1A and 1B showing the mini disc recording/playback apparatus that is accomplished by the application of the data access controller based on an embodiment of this invention, an optical pickup 2 made up of a laser diode and photodiode operates in playback mode to emit a laser beam to an optical disc 1 and receive the reflected light from the optical disc 1 to produce a playback RF signal from the return light. A demodulator 4B demodulates the playback RF signal provided by the optical pickup 2 and loads the resulting digital signal into a SRAM 10 (memory means).

The SRAM 10 has a capacity of 1 mega-bits (M bits), for example, for holding data of two ECC blocks. These ECC blocks will be called ECC-BLOCK-A and ECC-BLOCK-B in the following. Data of unit size of a ECC block from the demodulator 4B is written to the areas of ECC-BLOCK-A and ECC-BLOCK-B in the SRAM 10 alternately.

On completion of writing of an ECC block to the SRAM 10, an ECC decoder 5B implements the error detection/correction process for the ECC block. This process includes three successions of an error correction process which is based on the C1 code for mainly correcting random errors and three successions of an error correction process which is based on the C2 code for mainly correcting burst errors.

An ID decoder 6B decodes a prescribed ID, and a descrambler 7B implements the descrambling process for scrambled data. An error-detecting code (EDC) decoder 8B implements the EDC decoding process, and a DRAM 9B holds data from the EDC decoder 8B and releases the data at a certain timing.

A DRAM 9A holds data which comes in from the outside, and an EDC encoder 8A appends an EDC to the data which is provided by the DRAM 9A. A scrambler 7A implements the scrambling process for the data provided by the EDC encoder 8A, and an ID encoder 6A appends a prescribed ID to the data provided by the scrambler 7A and loads the resulting data into the SRAM 10.

The SRAM 10 is designed to hold two ECC blocks, ECC-BLOCK-A and ECC-BLOCK-B as mentioned above, with input data being written as ECC-BLOCK-A and ECC-BLOCK-B alternately. Namely, the single SRAM 10 is divided logically into an area for holding ECC-BLOCK-A and another area for holding ECC-BLOCK-B, as shown dividedly in FIG. 1.

An ECC encoder 5A (parity appending means) begins the ECC encoding process in response to the writing of an ECC block into the SRAM 10 to append an ECC (error correction code) to the data. In recording mode, this ECC appending operation by the ECC encoder 5A takes place once for each of the C1 and C2 codes.

The ECC block held in the SRAM 10 is read out and modulated by a modulator 4A, and thereafter fed to a magnetic-field modulation driver 3, which modulates the magnetic field in accordance with the signal provided by the modulator 4A. During these operations, the laser beam from the optical pickup 2 is casted to the optical disc 1 so that data which is in terms of the variation of magnetic field is recorded on the optical disc 1.

Next, the operation in playback mode will be explained with reference to the timing chart of FIG. 2. Data of one ECC block is read out of the optical disc 1 by the optical pickup 2 and fed to the demodulator 4B. The demodulator 4B demodulates the data, and the demodulated ECC block data is written into the ECC-BLOCK-A area of SRAM 10 for example. Concurrently to this operation, another ECC block data which has already undergone the ECC process is sent out to the outside, and the address of this output data is used to write next data from the demodulator 4B.

Data of one ECC block provided by the demodulator 4B and written to the ECC-BLOCK-B area undergoes the ECC process. Accordingly, writing of the data ECC-BLOCK-A, release of the data ECC-BLOCK-A to the outside, and ECC-processing for the data ECC-BLOCK-B are carried out concurrently on a time-slice basis during a certain time period.

On completion of the ECC process for the data in the ECC-BLOCK-B area, data output to the outside begins. On completion of writing of data of one ECC block to the ECC-BLOCK-A area, the ECC process begins for the data and, at the same time, writing of data from the demodulator 4B to the ECC-BLOCK-B area begins.

Writing of data of one ECC block from the demodulator 4B into the SRAM 10 takes a longer time than the ECC process for data of one ECC block, and therefore release of the data ECC-BLOCK-A, for example, from the SRAM 10 to the outside is commenced earlier by a prescribed time length T1 than the commencement of writing of data from the demodulator 4B to the ECC-BLOCK-A area of SRAM 10. Similarly, release of data ECC-BLOCK-B from the SRAM 10 to the outside is commenced earlier by the time length T1 than the commencement of data writing from the demodulator 4B to the ECC-BLOCK-B area.

Based on the release of data from the SRAM 10 to the outside earlier than writing of data from the demodulator 4B into the SRAM 10, it is possible to prevent data in the SRAM 10 to be released from being overwritten by new data from the demodulator 4B even in case the commencement of data writing from the demodulator 4B into the SRAM 10 advances.

Next, the operation in recording mode will be explained with reference to the timing chart of FIG. 3. At the commencement of output of data of one ECC block from the ECC-BLOCK-A area of SRAM 10 to the modulator 4A, the ECC-BLOCK-B area of SRAM 10 has just written data of one ECC block and begins the ECC process for the data. On expiration of a prescribed time length T2, writing of external data into the ECC-BLOCK-A area begins.

Following data output from the ECC-BLOCK-A area to the modulator 4A and writing of external data into the ECC-BLOCK-A area, the ECC process for appending the C2 and C2 parities to the data begins, and the feed of ECC-processed data from the ECC-BLOCK-B area to the modulator 4A begins. On expiration of the time length T2, writing of external data into the ECC-BLOCK-B area begins. Data writing takes place in sequential order to addresses from which data have been fed to the modulator 4A.

By delaying data writing into the SRAM 10 by a prescribed time length from data feed from the SRAM 10 to the modulator 4A in this manner, it is possible to prevent data in the SRAM 10 which is not yet released from being overwritten by new external data even in case there emerges a time lag in sending out data from the SRAM 10 to the outside.

Figure 2:
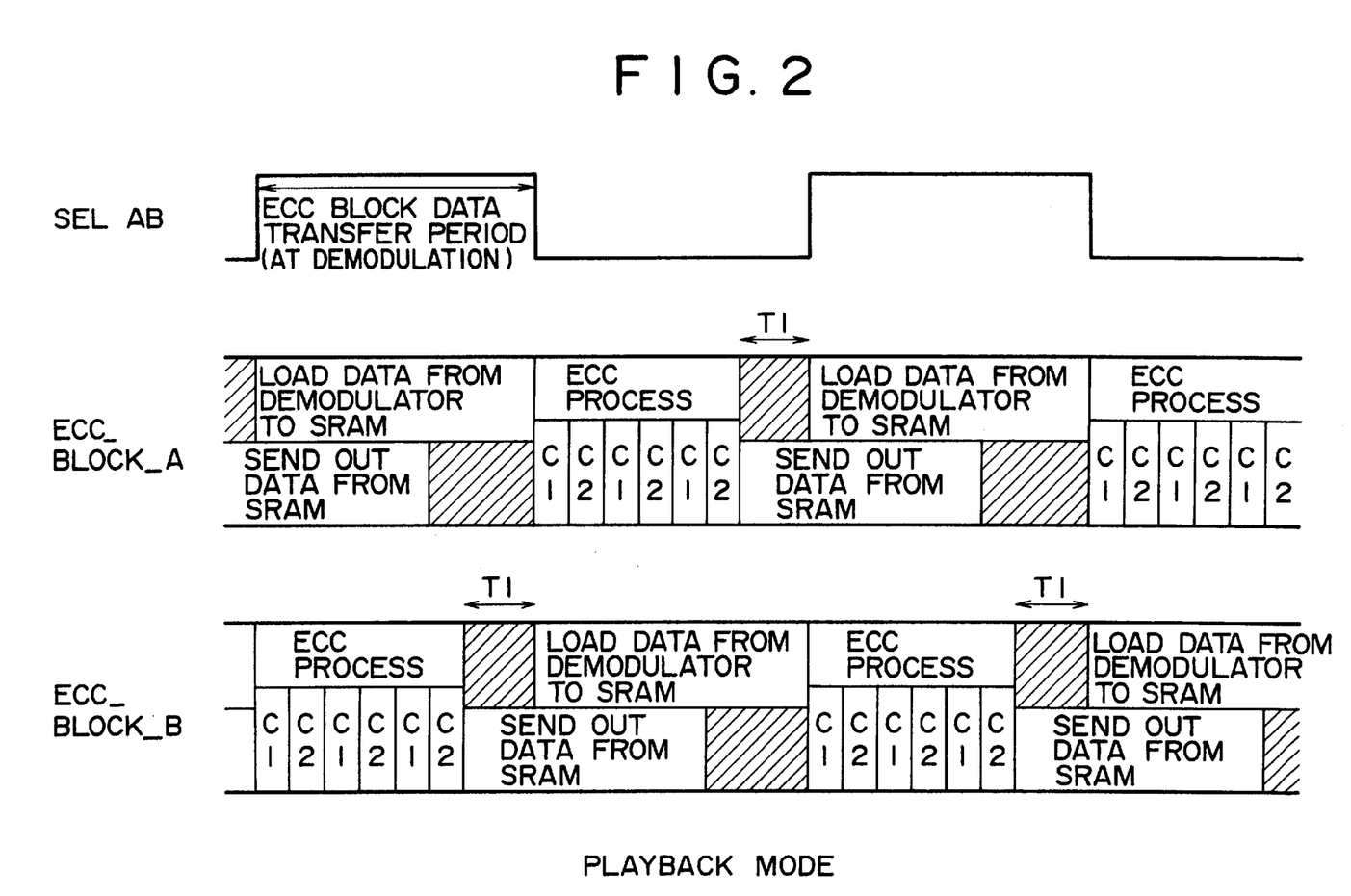
FIG. 2 is a timing chart showing the operation of the apparatus in data playback mode.
Figure 3:
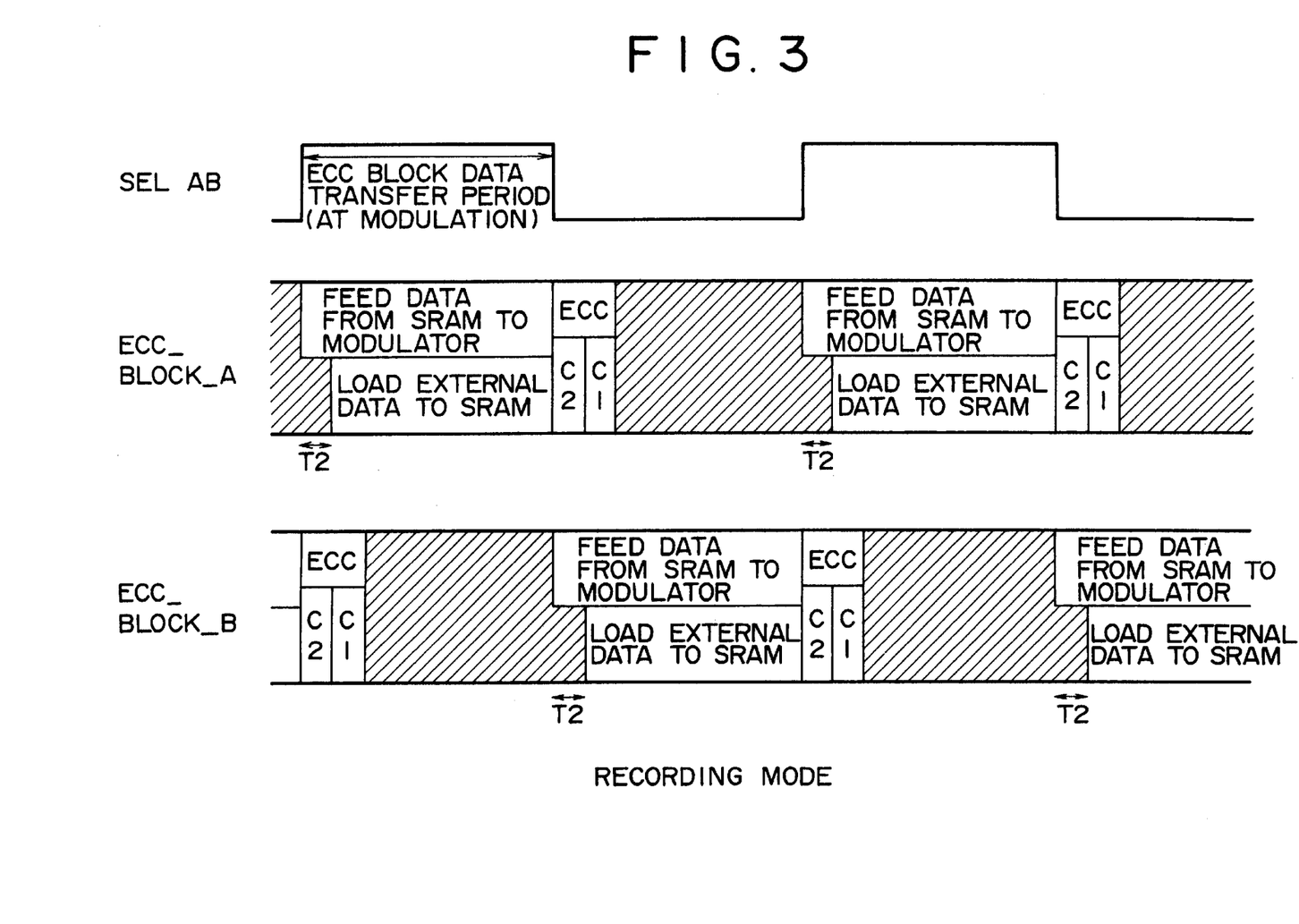
FIG. 3 is a timing chart showing the operation of the apparatus in data recording mode.

In FIG. 2 and FIG. 3, the modulator 4A and demodulator 4B have the bit-wise serial operations, whereas the SRAM 10 writes and reads out data in 8-bit length, i.e., "burst" data transfer. Time gaps emerging between data transfer operations are used for data transaction with the ECC encoder 5A or ECC decoder 5B (these devices will be called integrally "ECC core 5") and with the ID encoder 6A or ID decoder 6B (these devices will be called integrally "external I/O interface 6").

Figure 4:
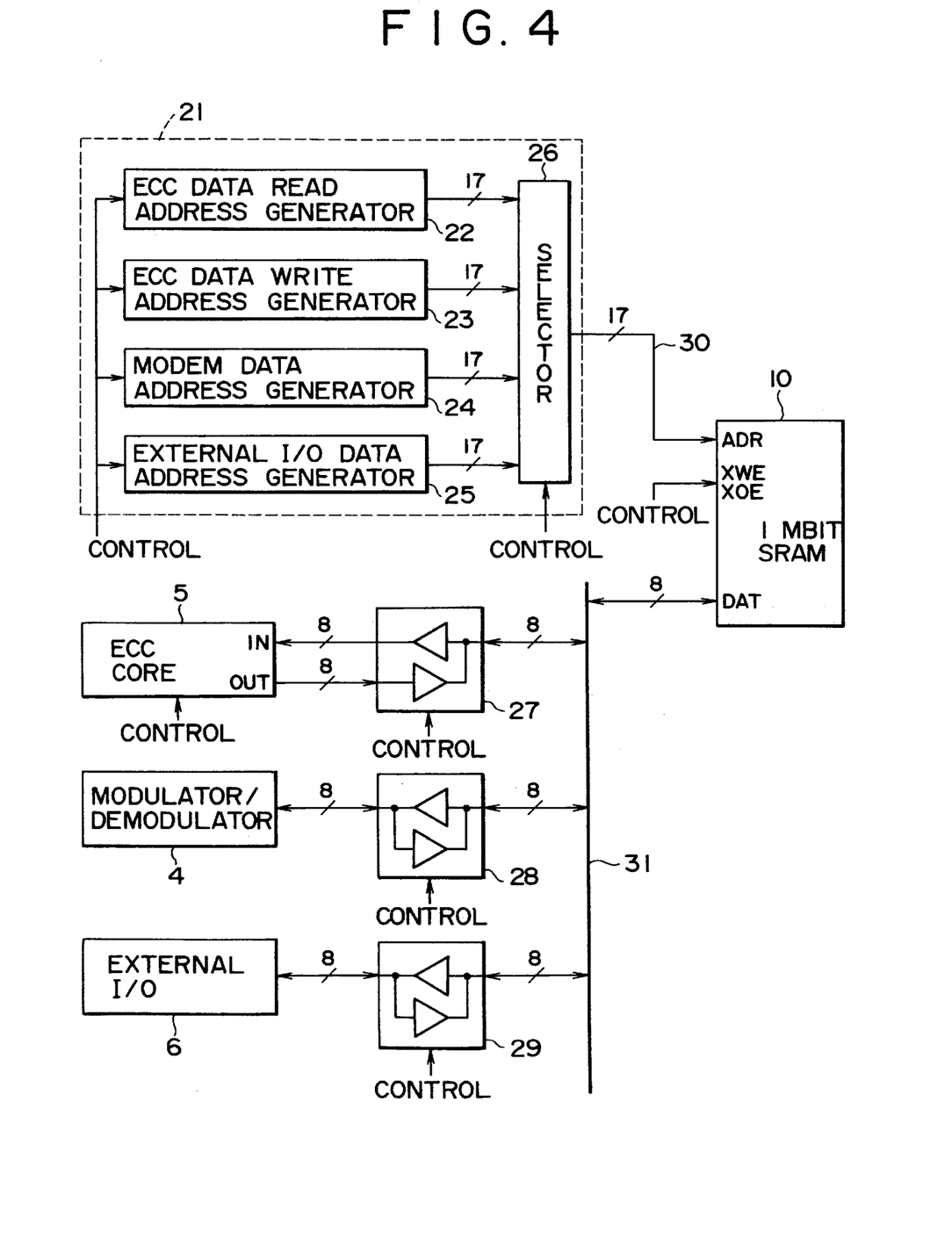
FIG. 4 is a block diagram showing an example of an address generation circuit.

FIG. 4 shows an example of an address generation circuit 21 which generates addresses of the SRAM 10 for data transaction with the ECC core 5, the modulator 4A and demodulator 4B (these will be termed integrally "modem 4"), and the external I/O interface 6.

An ECC data read-address generator 22 (address generation means) operates in response to the control signal from the control circuit (not shown) to generate an address of the SRAM 10 used by the ECC core 5 for reading out data from the SRAM 10 during the ECC process. An ECC data write-address generator 23 (address generation means) operates in response to the control signal from the control circuit to generate an address of the SRAM 10 used by the ECC core 5 for writing data into the SRAM 10 during the ECC process.

A modem data address generator 24 (address generation means) operates in response to the control signal from the control circuit to generate an address of the SRAM 10 used by the modem 4 for writing or reading out data to/from the SRAM 10 during the ECC process.

An external I/O data address generator 25 (address generation means) operates in response to the control signal from the control circuit to generate an address of the SRAM 10 used by the external I/O interface 6 for writing or reading out data to/from the SRAM 10.

A selector 26 (address providing means) receives address signals from the ECC data read-address generator 22, ECC data write-address generator 23, modem data address generator 24 and external I/O data address generator 25, and sends an address signal selectively to the ADR terminals of the SRAM 10 over the address bus 30.

The ECC core 5 has data input terminals and data output terminals for its frequent data transaction with the SRAM 10 through a buffer 27 during the ECC process. The buffer 27 operates in response to the control signal from the control circuit to place data released by the ECC core 5 on the data bus 31 and send it to the SRAM 10 or send data released by the SRAM 10 to the ECC core 5.

The modem 4 has I/O terminals for writing or reading out data of one ECC block to/from the SRAM 10. The buffer 28 operates in response to the control signal from the control circuit to transfer data from the modem 4 to the SRAM 10 or transfer data from the SRAM 10 to the modem 4.

Similarly, the external I/O interface 6 has I/O terminals for writing or reading out data of one ECC block to/from the SRAM 10. The buffer 29 operates in response to the control signal from the control circuit to transfer data from the external I/O interface 6 to the SRAM 10 or transfer data from the SRAM 10 to the external I/O interface 6.

Besides the ADR terminals, the SRAM 10 has terminals for receiving write enable signal and output enable signals from the control circuit and DAT terminals for transacting 8-bit data through the data bus 31.

Figure 5:
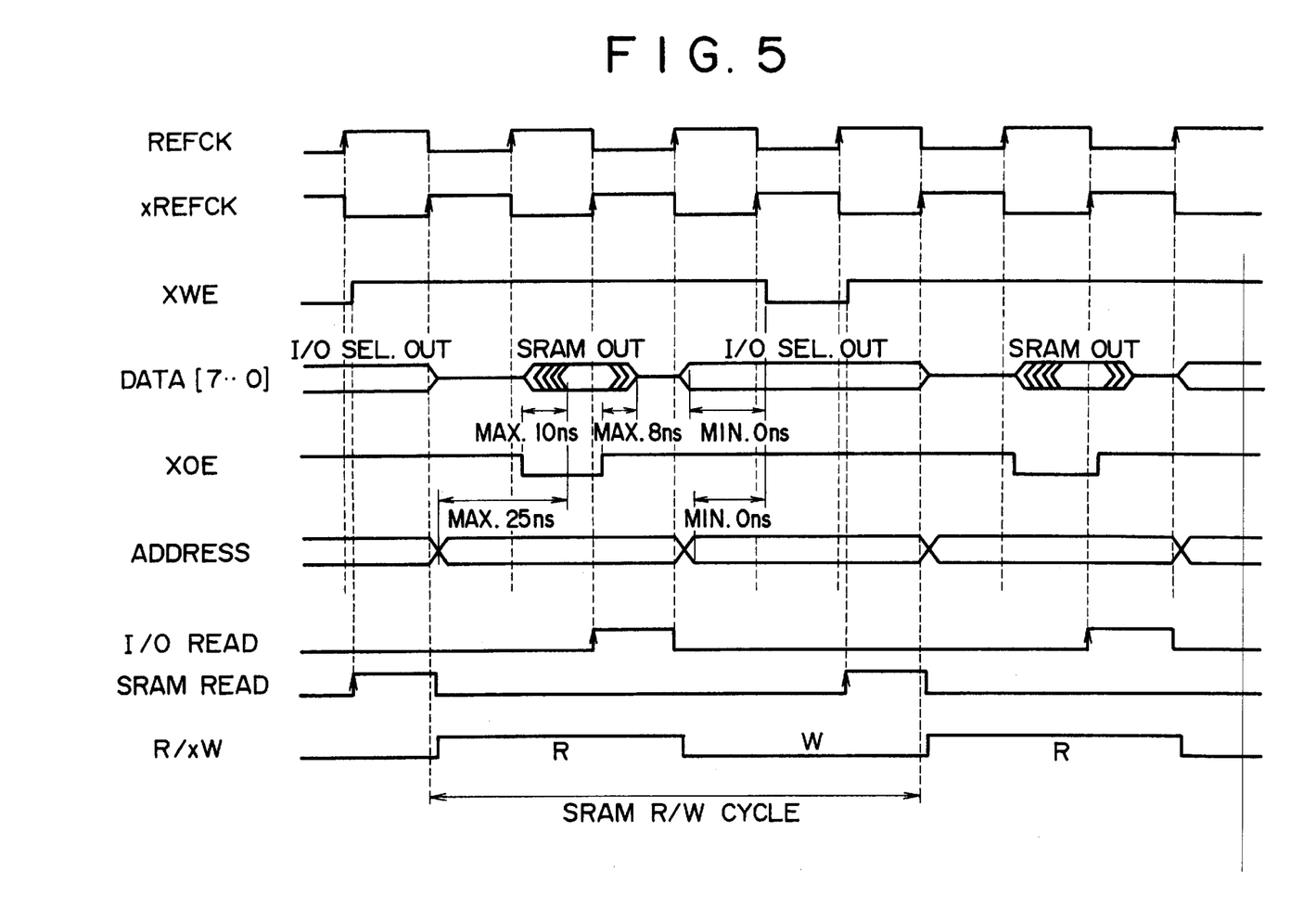
FIG. 5 is a timing chart showing the operation of the apparatus in making access to an SRAM 10.

FIG. 5 shows the timing chart of the data read/write operations of the SRAM 10 which is addressed by the address signal generated by the address generation circuit 21 shown in FIG. 4. Clock signals REFCK and xREFCK are out of phase from each other by 180°. The write enable signal XWE falls in response to the rising of every third xREFCK clock and rises in response to the next rising of the REFCK clock. During the low period of the XWE signal, 8-bit data on the DAT terminals of the SRAM 10 is written into the SRAM 10.

The output enable signal XOE falls in response to the rising of every third REFCK clock and rises in response to the next rising of the xREFCK clock. During the low period of the XOE signal, 8-bit data is read out from the SRAM 10 to its DAT terminals. The address signal ADDRESS generated by the address generation circuit 21 is revised in every 3/2 clock period by the selector 26.

In this manner, 1-byte data can be written and read out to/from the SRAM 10 in every third clock period. This is the minimum possible clock interval for data read/write, and the process in need can be implemented without raising the clock frequency. The ECC process is a byte-wise process, and the error correction ability can be enhanced by increasing the number of times of repetitive processing. The error correction process takes place three times for each of the C1 and C2 parities.

Figure 6:
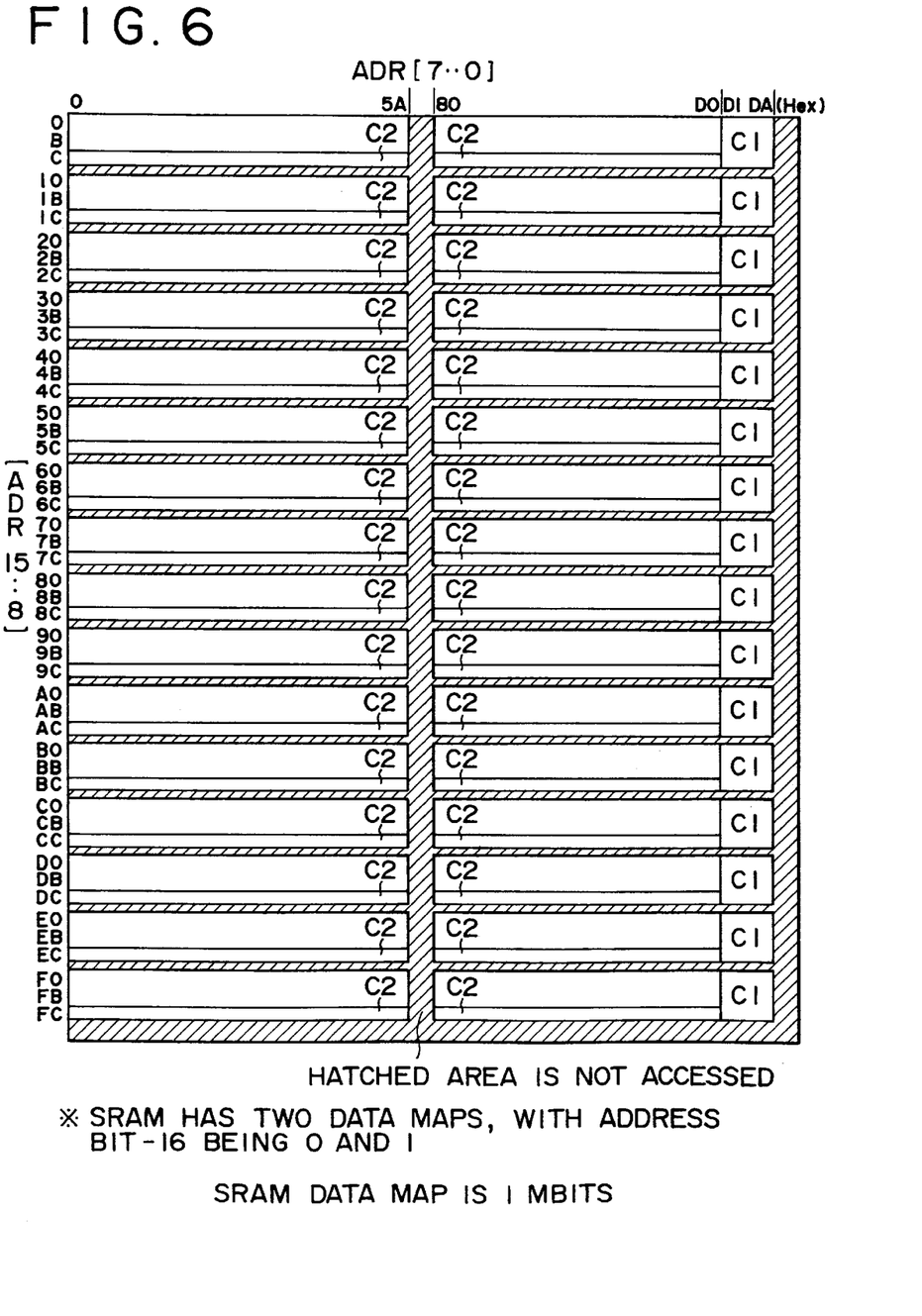
FIG. 6 is a diagram showing mapping of ECC block data held in the SRAM 10.

FIG. 6 shows the data map of one ECC block held in the SRAM 10. The ECC block address is 16 bits, with bit 0 through bit 7 being plotted horizontally and bit 8 through bit 15 being plotted vertically in the figure. Among the whole address space, data is held at addresses having their low-order bits 0–7 ranging 0–5A and 80–D0 and their high-order bits 8–15 of values ranging 0–B, 10–1B, 20–2B, 30–3B, 40–4B, 50–5B, 60–6B, 70–7B, 80–8B, 90–9B, A0–AB, B0–BB, C0–CB, D0–DB, E0–EB, and F0–FB in hexadecimal value.

The C2 parities are held at addresses having their low-order bits of values ranging 0–5A and 80–D0 and their high-order bits of values C, 1C, 2C, 3C, 4C, 5C, 6C, 7C, 8C, 9C, AC, BC, CC, DC, EC, and FC. The C1 parities are held at addresses having their low-order bits of values ranging D1–DA and their high-order bits of values ranging 0–C, 10–1C, 20–2C, 30–3C, 40–4C, 50–5C, 60–6C, 70–7C, 80–8C, 90–9C, A0–AC, B0–BC, C0–C, D0–DC, E0–EC, and F0–FC. The remaining addresses are left unused for data and parity data.

The SRAM 10 has its address expressed by 17 bits, and has the address map shown in FIG. 6 for each of MSB bit-16 of "0" and "1", so that it can store two ECC blocks.

At modulation or demodulation, the address map is scanned sequentially from left to right and from top to bottom in the figure. This signifies that ECC blocks are accessed, with their C2 parities being scattered. Specifically, when data aligning horizontally is assigned to a frame, each time data of 12 frames are accessed, the C2 parities of one frame are accessed. For one ECC block, a total of 192 frames of data and 16 frames of C2 parities are accessed.

Based on this data access scheme, even if data of several frames are lost due to a burst error, it is virtually possible to prevent the loss of C2 parities of multiple frames. At the end of encoding, the ECC core 5 accesses all C2 parity areas and stores batches of encoded C2 parities.

The single SRAM 10 for holding two ECC blocks minimizes the address bus lines and data bus lines, allowing a reduction of circuit scale. Time gaps resulting from the serial operation of the modem 4 and 8-bit data access to the SRAM 10 can be used effectively for the ECC process and external I/O operation, and the process in need can be implemented without raising the master clock frequency.

Although the foregoing embodiment is a mini disc recording/playback apparatus, the present invention is not confined to this application, but it is also applicable to the digital versatile disc (DVD) and other recording mediums and recording/playback apparatus.

According to the data access controller of a preferred embodiment, the memory means writes and reads out data at addresses given on a time-slice basis by the address providing means, and the address generation means generates addresses such that reading-out of data from a certain memory address by certain one of multiple kinds of processes takes place earlier by a prescribed time than writing of data to a memory address by a certain other process. Accordingly, the memory means can be accessed by multiple kinds of processes concurrently even if the processes shift in time. Consequently, multiple processes can run with a single memory means, enabling the reduction of circuit scale.

According to the data access controller of a preferred embodiment, the first clock generation means generates a first clock signal, the second clock generation means generates a second clock signal which is different in phase from the first clock signal, and the address generation means and address providing means operate in accordance with the first and second clock signals and the memory means is accessed for data input/output by being timed to the rising of the first and second clock signals, whereby multiple processes can be carried out efficiently on a time-slice basis.

According to the data access controller of a preferred embodiment the memory means writes and reads out data at addresses given on a time-slice basis by the address providing means, the parity appending means distributes the C2 parities so that their memory addresses scatter, and the address generation means generates different addresses for the case of the ECC encoding process in which the C1 and C2 parities are appended to data and for the case of the data modulation process or data demodulation process, whereby loss of C2 parities of multiple frames at once can be prevented and the error correction ability can be enhanced.

According to the data access control method of a preferred embodiment, memory addresses are generated such that reading-out of data from a certain memory address by certain one of multiple kinds of processes takes place earlier by a prescribed time than writing of data to a memory address by a certain other process, and the addresses are given on a time-slice basis to the memory means, whereby the memory means can be accessed by multiple kinds of processes concurrently even if the processes shift in time. Consequently, multiple processes can run with a single memory device, enabling the reduction of circuit scale.

What is claimed is:

1. A data access controller comprising:

means of memorizing data;

means of generating addresses for making access to said memory means in correspondence to multiple kinds of processes; and means of providing the addresses on a time-slice basis for said memory means, wherein said memory means is accessed for data reading and writing at addresses given on a time-slice basis by said address providing means, and said address generation means generates addresses such that reading-out of data from a certain memory address by a certain one of the multiple kinds of processes takes place earlier by a prescribed time than writing of data to a memory address by a certain other process of said multiple kinds of processes, wherein said multiple kinds of processes include a data modulation process, a data demodulation process, an ECC encoding process for appending C1 and C2 parities to data, and an error detection/correction process which is based on the C1 and C2 parities.

2. A data access controller comprising:

means of memorizing data;

means of generating addresses for making access to said memory means in correspondence to multiple kinds of processes; and means of providing the addresses on a time-slice basis for said memory means, wherein said memory means is accessed for data reading and writing at addresses given on a time-slice basis by said address providing means, and said address generation means generates addresses such that reading-out of data from a certain memory address by certain one of the multiple kinds of processes takes place earlier by a prescribed time than writing of data to a memory address by certain one other process, and wherein said multiple kinds of processes include a data modulation process, data demodulation process, data input/output process, ECC encoding process for appending C1 and C2 parities to data, and error detection/correction process which is based on the C1 and C2 parities, and wherein said data modulation process and data demodulation process which transact data with said memory means at a constant transfer rate are carried out on a priority basis over other processes that are carried out in time gaps of the modulation and demodulation processes.

3. A data access controller comprising:

means of memorizing data;

means of generating addresses for making access to said memory means in correspondence to multiple kinds of processes; and means of providing the addresses on a time-slice basis for said memory means, wherein said memory means is accessed for data reading and writing at addresses given on a time-slice basis by said address providing means, and said address generation means generates addresses such that reading-out of data from a certain memory address by certain one of the multiple kinds of processes takes place earlier by a prescribed time than writing of data to a memory address by certain one other process, and wherein said address providing means provides addresses for a data modulation process and a data demodulation process in correspondence to an address map of ECC blocks.

4. A data access controller comprising:

means of memorizing data;

means of generating addresses for making access to said memory means in correspondence to multiple kinds of processes; and means of providing the addresses on a time-slice basis for said memory means, wherein said memory means is accessed for data reading and writing at addresses given on a time-slice basis by said address providing means, and said address generation means generates addresses such that reading-out of data from a certain memory address by certain one of the multiple kinds of processes takes place earlier by a prescribed time than writing of data to a memory address by certain one other process, and wherein said multiple kinds of processes include a data modulation process, data demodulation process, data input/output process, ECC encoding process for appending C1 and C2 parities to data, and error detection/correction process which is based on the C1 and C2 parities, and wherein said error detection/correction process which is implemented for data written in said memory means after said data demodulation process is carried out three times for each of the C1 and C2 parities.

5. A data access controller comprising:

means of memorizing data;

means of generating addresses for making access to said memory means in correspondence to multiple kinds of processes;

means of providing the addresses on a time-slice basis for said memory means; and means of appending C1 and C2 parities to data, wherein the memory means writes and reads out data at addresses given on a time-slice basis by said address providing means, said parity appending means distributes the C2 parities so that their memory addresses scatter, and said address generation means generates different addresses for the case of the ECC encoding process in which the C1 and C2 parities are appended to data and for the case of the data modulation process or data demodulation process.

6. A data access controller according to claim 5, wherein said address generation means generates addresses for making access to the C1 and C2 parities at once at the end of process in the case of the ECC encoding process in which the C1 and C2 parities are appended to data or the ECC decoding process in which data undergoes error detection/correction, or generates addresses for making access to data and the C1 and C2 parities in correspondence to the address map of ECC blocks in the case of the data modulation process or data demodulation process.

7. A memory controller for controlling a memory for an error correction coding/decoding process, comprising:

a read address generator for generating a read address;

a write address generator for generating a write address;

a read/write address generator for generating a read/write address in order to write data to the memory in a demodulation process and to read data from the memory in a modulation process;

a selector for selecting an output from one of the read address generator, the write address generator and the read/write address generator; and a controller for controlling address generation timing, wherein said read address is generated a predetermined time before said write address is generated such that data corresponding to said read address is read out before data corresponding to said write address is written, wherein said data modulation process and said data demodulation process each which transact data with said memory at a constant transfer rate are carried out on a priority basis over other processes that are carried out in time gaps of the modulation and demodulation processes.

8. A memory controller for controlling a memory for an error correction coding/decoding process, comprising:

a read address generator for generating a read address;

a write address generator for generating a write address;

a read/write address generator for generating a read/write address in order to write data to the memory in a demodulation process and to read data from the memory in a modulation process;

a selector for selecting an output from one of the read address generator, the write address generator and the read/write address generator; and a controller for controlling address generation timing, wherein said read address is generated a predetermined time before said write address is generated such that data corresponding to said read address is read out before data corresponding to said write address is written, wherein said read/write address generator provides addresses for said data modulation process and said data demodulation process in correspondence with an address map of ECC blocks.

9. A memory controller for controlling a memory for an error correction coding/decoding process, comprising:

a read address generator for generating a read address;

a write address generator for generating a write address;

a read/write address generator for generating a read/write address in order to write data to the memory in a demodulation process and to read data from the memory in a modulation process;

a selector for selecting an output from one of the read address generator, the write address generator and the read/write address generator; and a controller for controlling address generation timing, wherein said read address is generated a predetermined time before said write address is generated such that data corresponding to said read address is read out before data corresponding to said write address is written, wherein said error correction coding/decoding process which is implemented for data written in said memory after said data demodulation process is carried out three times for each of C1 and C2 parities.

10. A method of controlling data access to/from a memory for an error correction coding/decoding process, comprising:

generating a read address;

generating a write address;

generating a read/write address in order to write data to the memory in a demodulation process and to read data from the memory in a modulation process;

selecting an output from one of the read address generator, the write address generator and the read/write address generator;

controlling address generation timing, wherein said read address is generated a predetermined time before said write address is generated such that data corresponding to said read address is read out before data corresponding to said write address is written; and prioritizing said data modulation process and said data demodulation process, each which transact data with said memory at a constant transfer rate, over other processes that are carried out in time gaps of the modulation and demodulation processes.

11. A method of controlling data access to/from a memory for an error correction coding/decoding process, comprising:

generating a read address;

generating a write address;

generating a read/write address in order to write data to the memory in a demodulation process and to read data from the memory in a modulation process;

selecting an output from one of the read address generator, the write address generator and the read/write address generator; and controlling address generation timing, wherein said read address is generated a predetermined time before said write address is generated such that data corresponding to said read address is read out before data corresponding to said write address is written, wherein said read/write address generating step includes providing addresses for said data modulation process and said data demodulation process in correspondence with an address map of ECC blocks.

12. A method of controlling data access to/from a memory for an error correction coding/decoding process, comprising:

generating a read address;

generating a write address;

generating a read/write address in order to write data to the memory in a demodulation process and to read data from the memory in a modulation process;

selecting an output from one of the read address generator, the write address generator and the read/write address generator; and controlling address generation timing, wherein said read address is generated a predetermined time before said write address is generated such that data corresponding to said read address is read out before data corresponding to said write address is written, wherein said error correction coding/decoding process which is implemented for data written in said memory after said data demodulation process is carried out three times for each of C1 and C2 parities.

* * * * *